(Model.)

F. A. HUBEL & F. REINHOLD.

DEVICE FOR STIRRING MELTED GELATINE FOR MAKING CAPSULES.

No. 316,896. Patented Apr. 28, 1885.

ATTEST
Samuel Lothrop
Sumner Collins

INVENTOR
F. A. Hubel
Frank Reinhold,
by Geo. H. Lothrop atty

UNITED STATES PATENT OFFICE.

FREDERICK A. HUBEL AND FRANK REINHOLD, OF DETROIT, MICHIGAN; SAID REINHOLD ASSIGNOR TO SAID HUBEL.

DEVICE FOR STIRRING MELTED GELATINE FOR MAKING CAPSULES.

SPECIFICATION forming part of Letters Patent No. 316,896, dated April 28, 1885.

Application filed July 18, 1884. (Model.)

*To all whom it may concern:*

Be it known that we, FREDERICK A. HUBEL and FRANK REINHOLD, of Detroit, in the county of Wayne and State of Michigan, have invented a new and useful Improvement in Devices for Stirring Melted Gelatine, of which the following is a specification.

Figure 1:
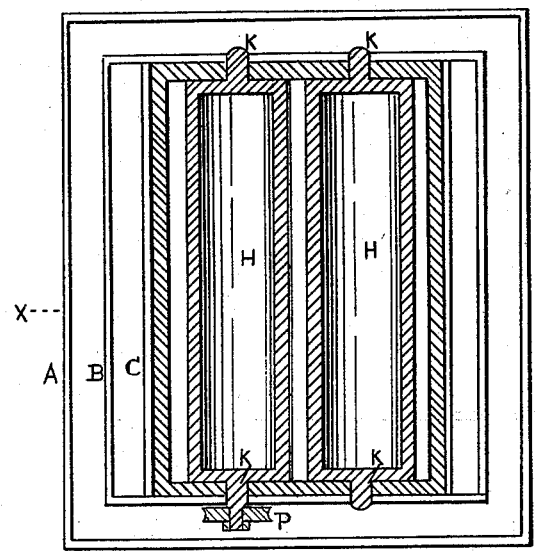
Figure 2:
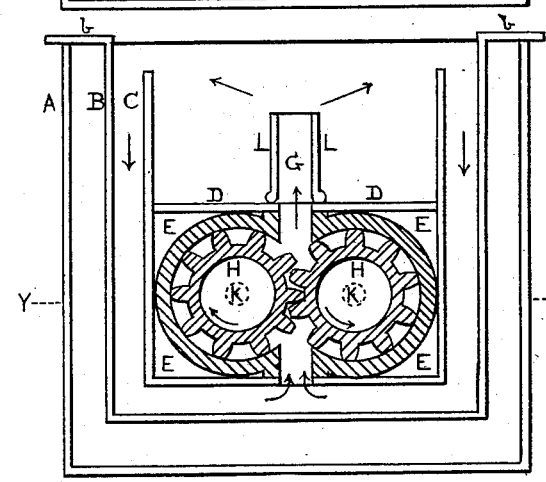
Figure 3:
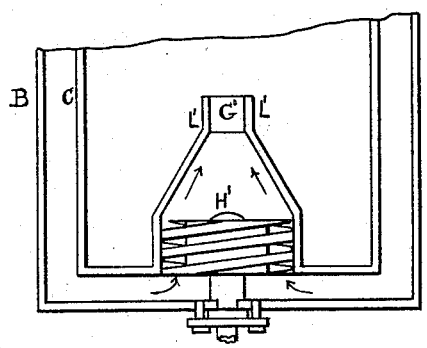

Figure 1 is a horizontal section on the line *y y*, Fig. 2. Fig. 2 is a vertical section on the line *x x*, Fig. 1; and Fig. 3 is a vertical section similar to Fig. 2, showing one of the modifications of our invention.

Our invention relates to means for stirring melted gelatine during the operation of making gelatine capsules; and it consists in certain combinations of mechanism hereinafter fully pointed out in the claims.

Gelatine capsules are commonly made by dipping metal pins held in a plate into a bath of melted gelatine, when the pins, being colder than the gelatine, chill a thin film of gelatine, which adheres to the pins, and, after being cut to length and removed from the pins, forms one part of the capsule. In order that the finished capsules may be of the same thickness, it is necessary to keep the gelatine at the same temperature, that it may have at all times the same fluidity, and this can only be done by stirring the gelatine, as the surface, which is exposed to the air, becomes cooler than the lower portion, which is nearer the source of heat. In stirring by hand or from the surface in any way bubbles of air are apt to be caught in the gelatine and make bad spots in the capsules.

Our invention is designed to stir the gelatine without the disadvantages named, and its principle consists in keeping the melted gelatine in constant circulation through the dish in which it is contained, so that the surface is constantly changing. The mechanism which we prefer for this purpose, and have illustrated in the drawings, is as follows:

A B C represent three dishes, usually made of tinned iron, of different sizes, so that B will set within A, being held in place by the flanges *b*, which rest on the upper edge of A. C is made of such length as to just fit within B lengthwise, and the end walls of B and C are fastened together, but C is narrower than B, as shown in Fig. 2. The bottom of B is above the bottom of A, and the bottom of C is above the bottom of B. Through the bottom of C we cut a slot, and in the lower part of C we put a pump, which we have shown as a rotary pump, formed of a casing, E, and two toothed wheels or cylinders, H, hung on shafts K, which are journaled in the end walls of the casing E. We prefer to make the pump as long as the dish C, as shown, but it is obvious that our invention may be practiced by using a shorter pump. D represents a partition fastened across dish C, just above casing E, to keep the gelatine out of the spaces left between the pump casing and the walls of the dish, but it may be omitted, if desired, and the outside of the pump-casing may be cast so as to fill the lower part of the dish, in which case no partition D would be used. When this partition is used, a hole must be cut in it corresponding to the eduction-port of the pump.

We prefer to prolong the eduction-port of the pump towards the top of C by thin metal guides L L, which either are placed so that they will come between the rows of pins when dipped or may be too short to reach to the ends of the pins. These guides L L are hinged at their lower ends, as shown in Fig. 2, so that they can be laid down out of the way when it is desired to dip the gelatine out of C with a spoon.

The object of the guides is to confine the current of gelatine when it rises through dish C and deliver it nearly at the top center of the dish. This gives better results, but is not absolutely essential.

One of the shafts K projects through the end walls of the casing E and dishes B C, as shown in Fig. 1, being provided with a common stuffing-box to prevent leakage of gelatine, and has on its end a pulley, P, which is driven by a belt from any convenient source of power.

The operation of our invention is as follows: The dish A is filled with water to any desired height, usually to a point just above the bottom of B, and is placed over a lamp, a gas-jet, &c. Dishes B C are now placed in A and filled with gelatine. As soon as the gelatine is melted, the pump is set in operation, and draws the melted gelatine through the slot in the bottom of C and discharges it upwards in a stream through C. This causes the gelatine on the surface to descend between the walls of B and C, when it again passes through the pump. The arrows show the direction of the currents. The guides L L deliver the upward current near the top center of C, and thus insure a perfect circulation of the surface gelatine. It will be seen that this operation keeps the gelatine perfectly stirred, and at the same time absolutely avoids all disturbance of the gelatine at the surface which would be likely to produce air-bubbles therein. It also saves time in dipping, as the operative is not obliged, as now, to stir the gelatine before each dip of the pins.

Fig. 3 shows a modification of our invention, which we illustrate simply to more fully explain the principle of the invention. The dishes A B C are all used as before, but in place of the rotary pump is a vertical screw, H', which causes a current of gelatine through dish C, precisely as hereinbefore explained.

It is obvious that the direction of the current of gelatine may be reversed by reversing the direction of the movement of the pump, that different styles of pumps may be employed, and that the pump may be placed in different locations, instead of the one shown in the drawings, in either of the dishes B C, without departing from the principle of our invention.

What we claim as our invention, and desire to secure by Letters Patent, is—

1. A device for stirring melted gelatine during the operation of molding gelatine capsules, consisting of a dish for containing the melted gelatine and having a perforation through its bottom, an inclosing dish, and a pump for causing a current of gelatine to circulate through said dishes, substantially as and for the purposes described.

2. The combination of the dish B with the dish C, having a perforated bottom and perforated partition D, carrying the hinged guides L L and pump E, substantially as shown and described.

3. A stirring device for molding gelatine capsules, consisting of a dish for holding melted gelatine, having an opening in the bottom thereof connected with a source of supply higher than said dish or under pressure, and a forcing mechanism whereby a continuous current of gelatine is caused to flow through said dish, substantially as described.

F. A. HUBEL.
FRANK REINHOLD.

Witnesses:

HENRY M. CAMPBELL,
GEO. H. LOTHROP.